United States Patent
Rivero et al.

(10) Patent No.: US 11,561,318 B2
(45) Date of Patent: Jan. 24, 2023

(54) SYSTEMS AND METHODS FOR RADAR DETECTION

(71) Applicant: Baker Hughes Oilfield Operations LLC, Houston, TX (US)

(72) Inventors: Carlos Felipe Rivero, Katy, TX (US); Zhi Yong He, Cypress, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 293 days.

(21) Appl. No.: 16/815,878

(22) Filed: Mar. 11, 2020

(65) Prior Publication Data
US 2020/0319366 A1    Oct. 8, 2020

Related U.S. Application Data

(60) Provisional application No. 62/828,180, filed on Apr. 2, 2019.

(51) Int. Cl.
*E21B 47/12* (2012.01)
*E21B 47/13* (2012.01)
(Continued)

(52) U.S. Cl.
CPC ............ *G01V 3/30* (2013.01); *E21B 47/047* (2020.05); *E21B 47/117* (2020.05); *E21B 47/12* (2013.01);
(Continued)

(58) Field of Classification Search
None
See application file for complete search history.

(56) References Cited

U.S. PATENT DOCUMENTS

| 4,320,399 A | 3/1982 | Buck |
| 6,691,779 B1 | 2/2004 | Sezginer et al. |

(Continued)

FOREIGN PATENT DOCUMENTS

| AU | 2003204335 A1 * | 12/2004 | ............... G01V 3/30 |
| CN | 103278816 A | 5/2015 | |
| CN | 103266638 B | 3/2016 | |

OTHER PUBLICATIONS

International Search Report and Written Opinion for International Application No. PCT/US2020/025667 dated Jul. 10, 2020, 10 pgs.
(Continued)

*Primary Examiner* — Curtis A Kuntz
*Assistant Examiner* — Jerold B Murphy
(74) *Attorney, Agent, or Firm* — Sprinkle IP Law Group

(57) ABSTRACT

Embodiments of the present invention use radar technology to detect features or conditions in a well. A radar unit having an electronics subsystem and an antenna subsystem is positioned downhole in the well. The radar unit is coupled receive power from and communicate with to a surface system. The electronics subsystem generates RF signals which are provided to the antenna subsystem, generating radar wavefronts that are propagated toward areas of interest (e.g., farther downhole). The radar wavefronts may be electronically or mechanically steered in the desired direction. The antenna subsystem receives radar signals that are reflected back to the unit by features or conditions in the well. The received reflected signals are converted to electronic signals that are interpreted by the electronics subsystem of the radar unit or by the surface system to identify the features or conditions that caused the reflections.

15 Claims, 6 Drawing Sheets

(51) Int. Cl.
*E21B 47/047* (2012.01)
*G01V 3/30* (2006.01)
*G01V 3/34* (2006.01)
*E21B 47/117* (2012.01)
*H01Q 3/34* (2006.01)
*H01Q 3/02* (2006.01)

(52) U.S. Cl.
CPC ............. *E21B 47/13* (2020.05); *G01V 3/34* (2013.01); *H01Q 3/02* (2013.01); *H01Q 3/34* (2013.01)

(56) References Cited

U.S. PATENT DOCUMENTS

| | | | | |
|---|---|---|---|---|
| 8,096,355 | B2* | 1/2012 | McDaniel | G01V 3/30 166/250.1 |
| 8,912,806 | B2 | 12/2014 | Banks et al. | |
| 10,385,681 | B2* | 8/2019 | Chemali | E21B 43/20 |
| 2009/0277630 | A1 | 11/2009 | McDaniel | |
| 2013/0234879 | A1* | 9/2013 | Wilson-Langman | G01S 7/352 342/21 |
| 2016/0017702 | A1* | 1/2016 | Koscheev | E21B 47/002 166/66 |
| 2016/0069842 | A1 | 3/2016 | Bonavides | |
| 2018/0175898 | A1 | 6/2018 | Kollman | |

OTHER PUBLICATIONS

Baker, P.L., et al., Fluid, Lithology, Geometry, and Permeability Information From Ground-Penetrating Radar for Some Petroleum Industry Applications, Society of Petroleum Engineers, SPE 22976, Nov. 4-7, 1991, pp. 277-287.

Eyuboglu, Sami, et al., Detection of Water Leaks Using Ground Penetrating Radar, 17 pgs.

* cited by examiner

SYSTEMS AND METHODS FOR RADAR DETECTION

CROSS-REFERENCE TO RELATED APPLICATION

This application claims the benefit of priority under 35 U.S.C. § 119 to U.S. Provisional Patent Application No. 62/828,180 filed Apr. 2, 2019, the entire contents of which are hereby expressly incorporated by reference for all purposes.

BACKGROUND

Field of the Invention

The invention relates generally to systems for monitoring wells, and more particularly to systems and methods for enabling the detection of various different types of faults, such as formation or pipe movements, leaks, changing fluid levels or similar conditions in the well.

Related Art

Oil and gas production operations commonly involve the installation of various equipment in wells. The equipment may include well casing, production tubing, packers, pumps, gauges and many other types of apparatus. The environment downhole in a well may be very harsh and may result in a variety of different events or conditions that affect production from the well. For example, formations may shift or production tubing may move over time, causing breaks or leakage in the tubing, water levels or the levels of solids in the well may change, seals on packers or other equipment may fail, corrosion of tubing or other equipment may cause the equipment to fail, and so on.

Conventionally, detection of these different types of problems would require different monitoring or fault detection tools. For instance, one type of tool might be necessary to detect leaks in the production tubing or other pipes, while a different tool might be necessary to monitor changing water levels in the well, and yet another tool might be needed to detect movement of the geological formation. Additionally, conventional tools commonly have reliability concerns. For example, a number of conventional tools use fiber optic sensors to detect conditions of interest, but optical fibers are typically very brittle, and breaks in the fiber (and corresponding tool failures) may result from shifting formations. Conventional tools such as fiber optic sensing systems also typically require a substantial amount of hardware and software, so the cost of the equipment may be very high.

It would therefore be desirable to provide systems and methods that reduce or eliminate one or more of the problems described above.

SUMMARY

Embodiments of the present invention use radar technology to detect conditions such as movement of geological formations or pipes, leaks in the pipes, and changing levels of water and/or solids in the well. A radar unit is positioned downhole in the well to generate radar emissions that are directed toward areas of interest (e.g., farther downhole), and to receive radar signals that are reflected back to the unit. The received reflected signals are converted to electronic signals that are interpreted to identify the features or conditions that caused the reflections, such as phase boundaries (e.g., air-water boundaries). The embodiments disclosed herein may be useful in detecting downhole pipe leaks and other detrimental conditions in the well at ultra deep depths (e.g., up to about 70 miles).

One exemplary embodiment comprises a system that includes a surface power and communications system positioned at the surface of a well and a downhole radar system communicatively coupled to the surface power and communications system by one or more power and communication lines. The downhole radar system includes an electronics subsystem and an antenna subsystem communicatively coupled to the electronics subsystem. The electronics subsystem is configured to receive power from the surface power and communications system, generate radio frequency signals which are communicated to the antenna subsystem for generation of wireless radar wavefronts by the antenna subsystem, and receive signals from the antenna subsystem corresponding to received reflected wireless radar wavefronts. The antenna subsystem is configured to receive the radio frequency signals generated by the electronics subsystem, transmit radar wavefronts toward one or more downhole locations of interest, receive reflected wireless radar wavefronts from the one or more downhole locations of interest, and communicate electronic signals corresponding to the received reflected wireless radar wavefronts to the electronics subsystem.

The antenna subsystem is preferably a directional antenna, and may be any suitable type of antenna, including a linear phased array antenna, a Yagi antenna, a log periodic antenna, a bowtie antenna, or the like. The antenna may be steered electronically or physically. In one embodiment, the electronics subsystem and an antenna subsystem are configured to be contained within a housing that fits within an annular space between production tubing and a well casing or well bore walls. The downhole radar system has an outer diameter that is preferably less than 5". In one embodiment, the downhole radar system includes a main controller electronics subsystem having power and communications circuitry, an RF signal generator subsystem having baseband and RF signal generation circuitry, and an RF power amplification and impedance matching subsystem.

An alternative embodiment comprises a method that includes positioning a radar system downhole in a well, wherein the downhole radar system is communicatively coupled to a power and communications system positioned at the surface of the well. Power is then provided from the surface power and communications system to the downhole radar system via by one or more power lines coupled between the surface power and communications system and the downhole radar system. The downhole radar system generates RF signals in an electronics subsystem and provides the generated RF signals to an antenna subsystem of the radar system. The antenna subsystem emits radar signals from the received RF signals. The antenna subsystem further receives one or more reflected wireless radar wavefronts and provides to the electronics subsystem electronic signals corresponding to the received reflected wireless radar wavefronts. The electronics subsystem receives from the antenna subsystem the electronic signals corresponding to the received reflected wireless radar wavefronts and processes the electronic signals corresponding to the received reflected wireless radar wavefronts, thereby generating corresponding data that is communicated by the electronics subsystem to the surface power and communications system. The surface power and communications system identifies one or more downhole features based on the data corresponding to the received reflected wireless radar wavefronts which are received from the electronics subsystem.

The method may detect downhole features and/or conditions such as levels of water, fluids or solids, formation shifts, pipe leaks or pipe movement. Generating the wireless radar wavefronts may comprise steering the wavefront, such as by providing phase shifted copies of RF signals to multiple antenna elements and controlling the phase shift to thereby steer the generated emitted radar signals. The wavefront may alternatively be steered by physically moving components of the antenna elements so that they point in a different direction. The radar signals may be steered downhole in the same well, or they may be steered to wells external to the well in which the radar signals are generated, so that reflected radar wavefronts correspond to features in external wells. The antenna subsystem may be configured to receive the RF signals generated by the electronics subsystem, transmit radar signals toward one or more downhole locations of interest, receive reflected radar wavefronts from the one or more downhole locations of interest, and communicate electronic signals corresponding to the received reflected radar wavefronts to the electronics subsystem.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

Figure 1:
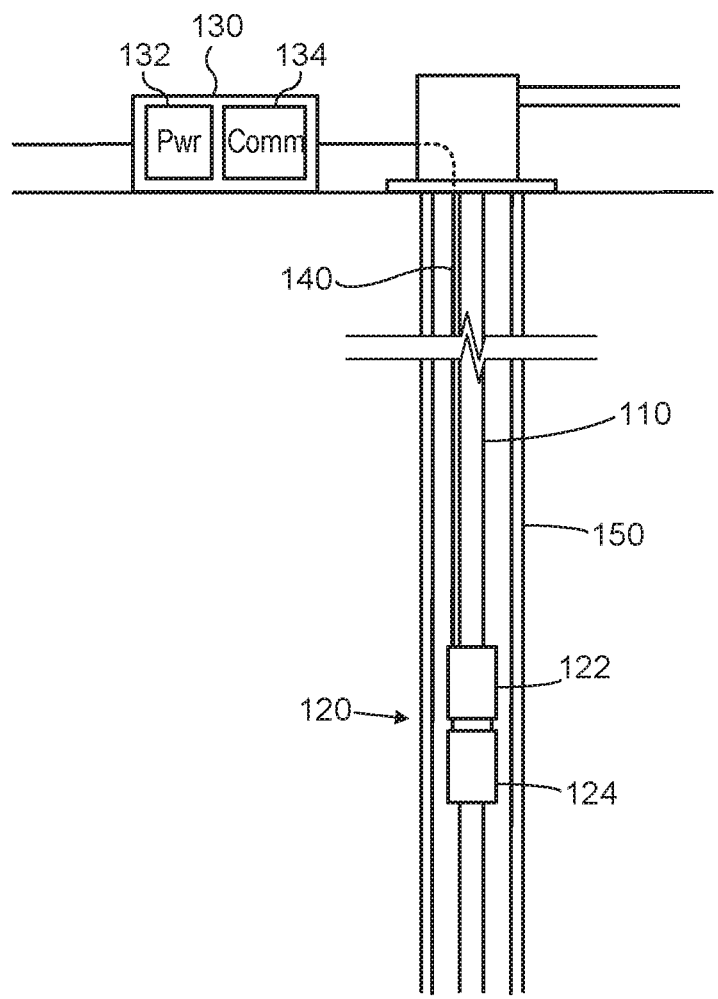
FIG. 1 is a diagram illustrating a downhole radar system for detecting leaks and other detrimental conditions in accordance with one exemplary embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments of the present invention are designed to use radar emissions to detect features or events downhole in a well. The wavefronts of the radar emissions propagate downhole and are reflected when they encounter changes in the media through which they are propagated. The radar reflections are received and interpreted to identify the features, conditions and/or events. The user of radar signals enables the detection of the features, conditions and/or events in real time. It may nevertheless be useful in some cases to analyze the data provided by analysis of the reflected radar signals over time. For example, detecting that water is present at a specific level within the well at a particular point in time might not be as significant as detecting that the water level rises over a period of time.

It may also be the case that the specific real-time features, conditions and/or events that are detected are not considered to be faults in and of themselves, but may instead be indicative of impending or future conditions. For instance, detected signals may indicate that a problematic condition may be projected in several years. With this knowledge, the well operation may be better able to prevent the problem or proactively resolve it.

While the embodiments described herein focus primarily on the detection of features within the same well in which the radar unit is installed, it should be noted that the wavefronts of the radar emissions can penetrate the surrounding formation, so they may be directed toward other wells which are nearby, and features in those wells may also be detected.

Referring to FIG. 1, a diagram illustrating an exemplary system in accordance with one embodiment of the present invention is shown. In this embodiment, production tubing 110 is installed in a cased well. A radar unit 120 is installed downhole in the well. By positioning the radar unit downhole in the well, the unit uses less power than would be necessary if the unit were positioned at the surface of the well, and receives stronger return (reflected) signals than if the unit were positioned at the surface of the well.

Radar unit 120 is designed to fit within the annular space between the production tubing 110 and the casing 150 of the well. In this embodiment, the radar unit may be characterized as a mandrel having a generally cylindrical profile. Radar unit 120 includes an upper section 122 which houses the unit's main controller electronics, and a lower section 124 which houses the electronics for radio frequency (RF) signal generation and amplification, and an antenna. Upper section 122 is coupled by a cable 140 to a surface unit 130. The cable may have dedicated lines to convey power to the downhole radar unit and carry communications to and from the downhole radar unit, or it may share power and communication lines with other equipment. In one embodiment, the cable may be, for example, comprise one or more tubing encapsulated conductors (TECs).

Surface unit 130 includes a power subsystem 132 that provides power to downhole radar unit 120. Power subsystem 132 may receive power from an external source and convert the power to a form suitable for downhole radar unit 120. Alternatively, power subsystem 132 may use an internal source of power such as a battery, or it may incorporate means to generate the power itself. The power provided to downhole radar unit 120 may be AC or DC, as required by the downhole unit, and the power may be provided at any voltage which is suitable for the downhole unit. Power subsystem 132 may incorporate any appropriate components that are necessary to generate, convert or otherwise provide power to downhole radar unit 120.

Surface unit 130 also includes a communications subsystem 134 that enables communication with a communication subsystem of downhole radar unit 120. Communications subsystem 134 may be coupled to surface control systems or other means for users to provide control inputs to downhole radar unit 120, and to receive data generated by downhole radar unit 120. Communications subsystem 134 may include transmitters, receivers, transceivers or other components as necessary to enable communications with downhole radar unit 120.

Figure 2:
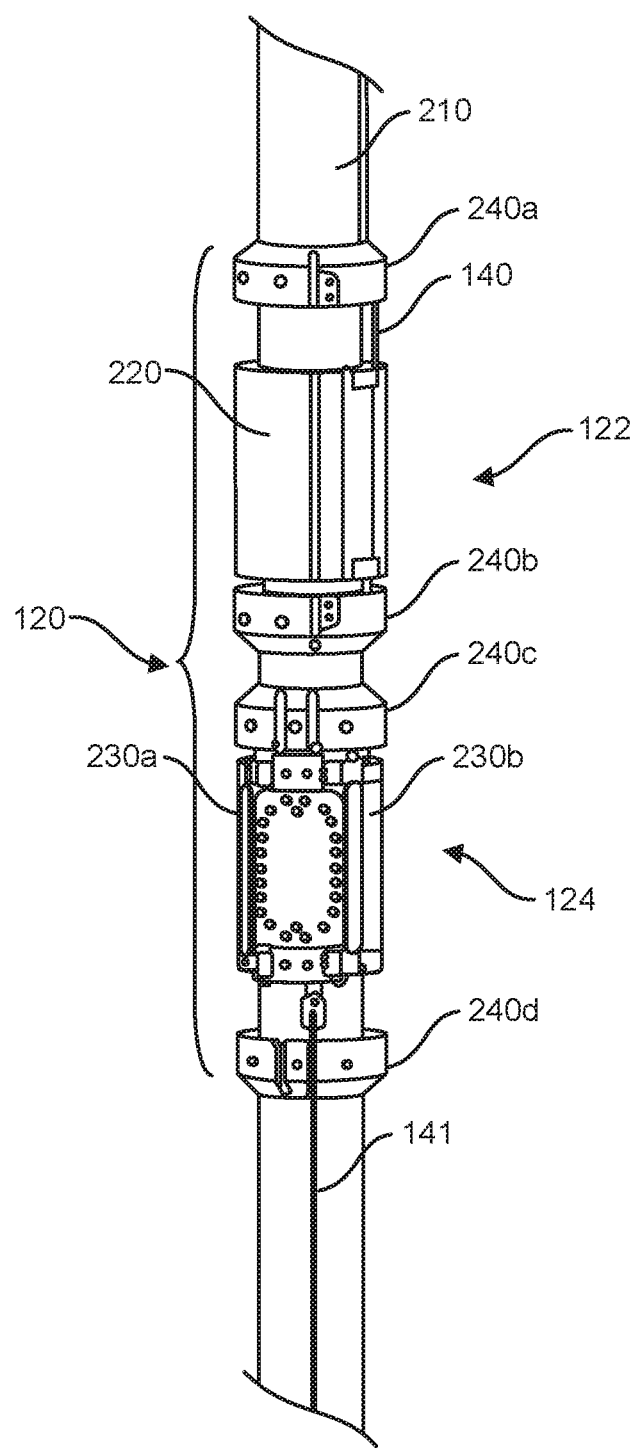
FIG. 2 is a functional block diagram illustrating an exemplary structure of a downhole radar unit in accordance with one embodiment.

Referring to FIG. 2, a more detailed view of the downhole radar unit in one embodiment is shown. As described above, the downhole radar unit includes an upper section 122 that houses the main controller electronics 220 and a lower section 124 that houses the electronics for RF signal generation and amplification and the antenna 230a-230b. In this embodiment, upper and lower sections 122 and 124 are mounted on a section of tubing 210 which forms a part of the conduit of the production tubing. Protective collars 240a-240d are provided above and below each of upper and lower sections 122 and 124. Collars 240a-240d have an outer diameter that is the same as, or larger than the outer diameters of the upper and lower sections so that the upper and lower sections will not be damaged by impact with the casing or walls of the wellbore when downhole radar unit 120 is installed or operated. The collars have vertical grooves, gaps or other apertures in which the cables (140, 141) connected to downhole radar unit 120 are positioned so that these cables will be protected as well.

The components of upper and lower sections 122 and 124 are housed in annular sections that are mounted on tubing section 210. The components may be grouped together or subdivided in any manner that is convenient and/or suitable to enable packaging of the components within the annular space between tubing section 210 and the wall of the well bore (e.g., the inner wall of the casing of the well). Because the diameter of the well may vary, depending upon the depth of the well, the allowable outer diameter of downhole radar unit 120 may be determined based upon the maximum depth at which the unit will be used. In one embodiment, downhole radar unit 120 has a maximum outer diameter of 5 inches.

Figure 3:
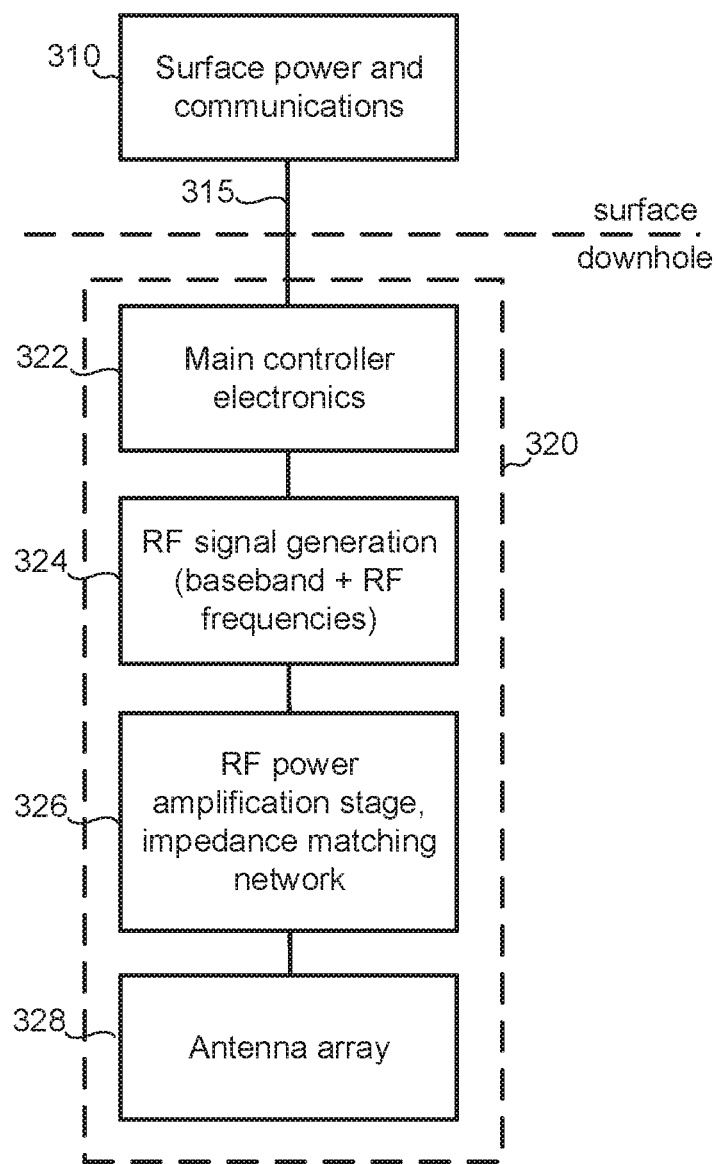
FIG. 3 is a functional block diagram illustrating a radar detection system in accordance with one exemplary embodiment.

Referring to FIG. 3, a functional block diagram of a radar monitoring and detection system in accordance with one embodiment is shown. In this embodiment, the system includes a surface unit 310 and a downhole unit 320. Surface unit 310 is installed at the surface of the well, while downhole unit 320 is installed within the well bore of the well. Surface unit 310 and downhole unit 320 are coupled together by one or more lines that extend from the surface unit into the well bore to the downhole unit. The lines include one or more electrical lines that carry power from the surface unit to the downhole unit. Communications between the surface unit and downhole unit may be carried by electrical lines, optical lines, or any other suitable carrier for the communication signals. In some cases, the communication signals may be carried on the same lines as the power (a "comms-on" power line), while in other cases, they may be carried by separate lines. The various power and communication lines may be referred to herein collectively simply as a cable.

Surface unit 310 produces power (e.g., by receiving power from an external source and generating either AC or DC power having a suitable output waveform and voltage) and provides this power to downhole unit 320 via cable 315. Surface unit 310 also communicates control signals to downhole unit 320. The control signals may be provided as inputs to surface unit 310, or the unit may include a processor, memory, I/O devices and other computing system components sufficient to receive user input and execute program instructions for generating the control signals.

The power and control signals are provided to the main controller electronics 322 of downhole unit 320. The main controller electronics perform high speed processing for the downhole unit, and controls the functioning of the downhole unit. The main controller electronics generates baseband signals and local control signals that are passed to RF signal generation unit 324. The main controller electronics also includes an FPGA (field programmable gate array) that is configured to sample RF signals at high speeds. RF signal generation unit 324 generates RF (radio frequency) signals that will be applied to the radar antenna 328. RF signal generation unit 324 performs IQ modulation to generate the RF signals and similarly performs IQ demodulation of received RF signals. The RF signals generated by the RF signal generation unit are provided to an RF power amplification stage and impedance matching network 326. The RF power amplification stage amplifies the received RF signals to level shift the RF signals to achieve optimum power levels that are needed to transmit the emitted radar signals over longer distances. The impedance matching network matches the impedance of the amplified RF signals to the medium into which the signals are emitted in order to maximize the efficiency of the power transfer to the radar wavefront. The amplified RF signals are then provided to the antenna 328 to generate the emitted radar signals. Antenna array 328 is selected to provide the best directivity and/or gain for power transmission down the well. In one embodiment, the antenna array is a phased array antenna that allows phase delays to be added between each antenna element to enable the emitted radar waves to be pointed in a selected direction (e.g., to point the radar wave to different sides of the casing).

Figure 4A:
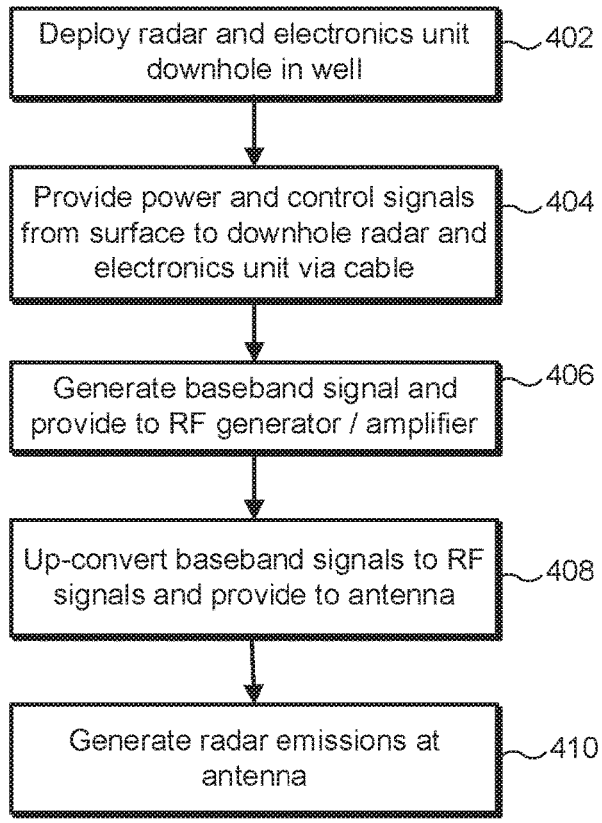
FIGS. 4A and 4B are a set of flow diagrams illustrating the operation of a radar detection system in accordance with one embodiment.

The operation of the system to generate radar signals is illustrated in FIG. 4A. As depicted in the figure, the radar unit (including main controller electronics, amplification electronics and antenna) is deployed downhole in the well (402) and power and control signals are provided to the downhole unit via the cable coupling the downhole unit to the surface power and communications unit (404). The main electronics subsystem of the downhole unit then generates a set of signals including a baseband signal which is provided to an amplifier of the downhole unit (406). The received signals are upconverted to RF signals, amplified, and provided to the antenna (408). The signal provided to the antenna then produces radar emissions that are directed toward a region of interest (410). As noted above, the region of interest is typically farther downhole from the radar unit in the same well, but may include regions of surrounding geological formations and nearby but separate wells.

Figure 4B:
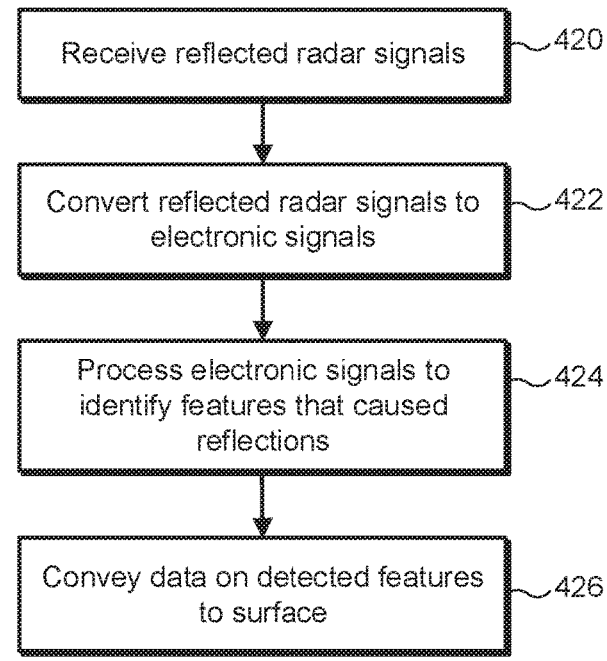

Radar signals that are emitted from the downhole unit propagate downhole (or toward other regions of interest) and are reflected when they encounter changes in the media through which they are propagating. The reflected radar signals are received by the antenna of the downhole radar unit as shown in FIG. 4B (420). In one embodiment, this is the same antenna that was used to generate the emitted radar signals. The received radar signals are converted by the radar unit to electronic signals (422). These electronic signals are processed by the main controller electronics to identify the features that caused the reflections to be returned to the downhole radar unit (424). The information generated by the main controller electronics is then conveyed to the surface unit via the power and communications cable (426).

Figure 5A:
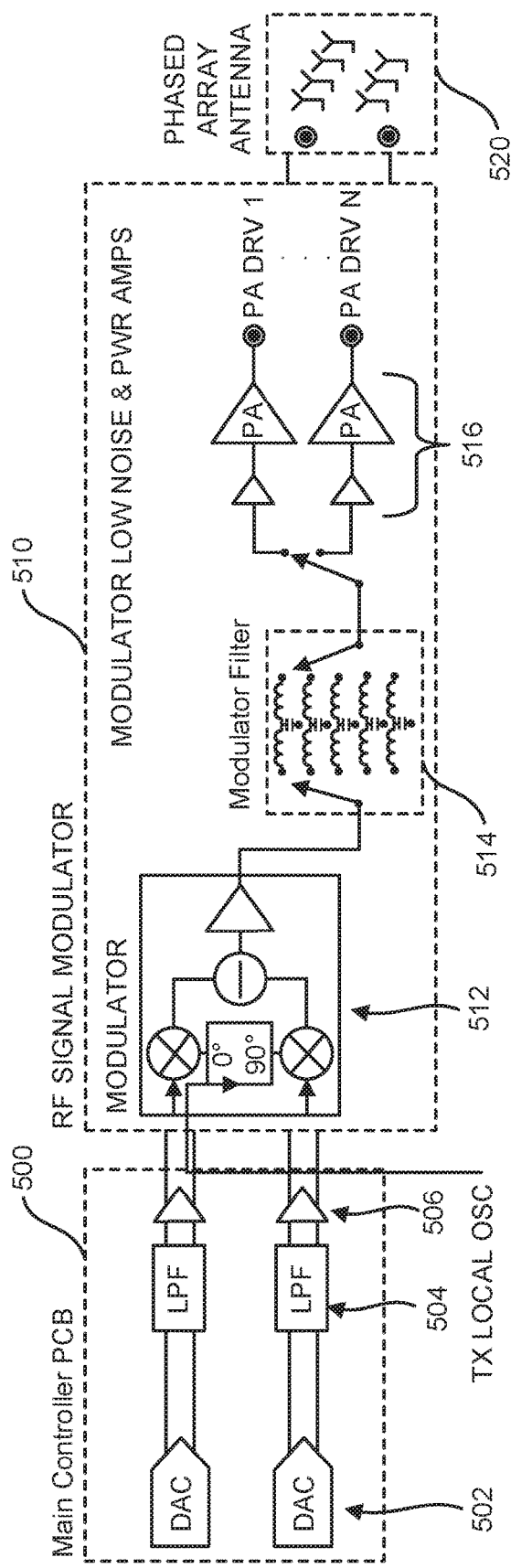
FIGS. 5A and 5B are diagrams illustrating signal paths in a radar detection system in accordance with one embodiment.
Figure 5B:
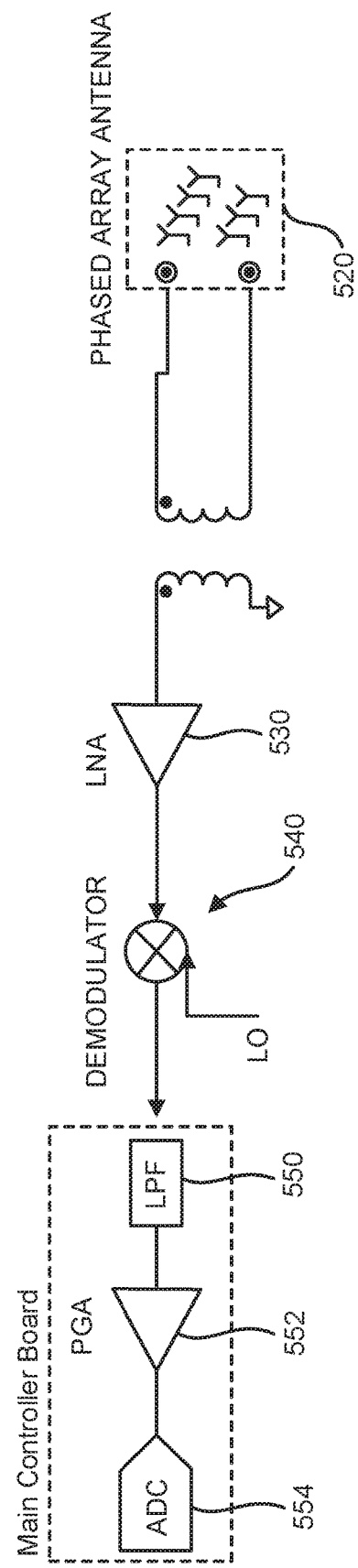

Referring to FIGS. 5A and 5B, the structure of the downhole radar unit in one embodiment is shown in more detail. FIG. 5A illustrates the structure relating to the transmission of radar emissions downhole, while FIG. 5B illustrates the structure relating to the reception and processing of reflected radar signals.

As shown in FIG. 5A, the main controller electronics 500 include a set of digital-to-analog converters ("DACs") 502 that receive digital signals communicated from the surface equipment to the downhole radar unit. The digital-to-analog converters convert the digital signals to analog signals and forward the signals to low-pass filters ("LPFs") 504. The low-pass filters provide their outputs to amplifiers 506, which generate outputs that are provided from the main controller electronics to the RF signal modulator electronics 510.

The signals from the main controller electronics are input to a modulator 512 which generates an RF signal that is provided to a modulator filter 514 that provides selectable filtering of the signal. The filtered signal is provided to low-noise and power amplifiers 516 that generate an output signal drive signal which is then provided to an antenna such as a phased-array antenna 520. The phased-array antenna generates the radar wavefront that is propagated downhole or towards other features of interest.

Referring to FIG. 5B, the components of the downhole radar unit that processed the received, reflected radar signals is shown. When the radar signals are reflected by a feature such as a phase change in the media through which the radar signals are propagated, the signals propagate back toward the downhole radar unit and are received by phased-array antenna 520, which converts the reflected radar wavefront into corresponding electronic signals. Antenna 520 is inductively coupled to low noise amplifier 530 to provide the electronic signals to the amplifier. The low noise amplifier provides its output to a demodulator 540, which demodulator the signal and passes it to main controller electronics. The main controller electronics include a low-pass filter 550 which filters the demodulated signal and provides it to amplifier 552. The amplified signal is an analog signal which is then converted by analog-to-digital converter ("ADC") 554 into a digital signal. The resulting digital signal may then be processed (e.g., analyzed or interpreted) by the main controller electronics locally, or it may be communicated from the main controller electronics to the surface equipment for such processing.

The antenna of the downhole radar unit may be any of a number of different types. For instance, the antenna may be a Yagi antenna, a bow tie antenna, a log periodic array antenna, or a linear antenna phased array. Preferably, the antenna is directional and steerable. In other words, it is advantageous to be able to direct the emitted radar wavefront in a desired direction (toward a region of interest). As used herein, "directional" refers to the ability of the antenna to direct radiated waves to a greater degree in in some directions than in others. "Steerable" is used herein to refer to the ability to change the direction in which the antenna radiates these electromagnetic waves. Preferably, the system will be both directional and steerable, although the antennas in some embodiments may not be steerable. A preferred embodiment uses a phased array antenna, which allows the radiated waves to be steered by adjusting a phase difference between signals emitted from different individual antenna elements in the array. It may be possible, however, to use a directional antenna that is steered mechanically by changing the positions of the antenna elements, rather than by adjusting the phase differences between antenna elements.

When selecting an antenna design to be used in the downhole radar unit, various factors should be considered. For example, the frequency range is preferably chosen to keep the total antenna dimension below 3", and the outer diameter of the unit housing the antenna is preferably no more than about 5". In one embodiment, the frequency of the radar signals may be selected to be in the range from 1 GHz to 10 GHz (corresponding to a wavelength of about 2.95"-0.295" (the UHF to X band region of RF spectrum). The antenna power radiation will vary with such factors as the distance to the target (region of interest), the directivity of the antenna, and the power of the signals input to the antenna. In a linear phased array antenna, the waves from each individual antenna element add constructively at some angle theta, causing the main lobe of the wavefront to be directed toward this angle. In this way, the radiation pattern's main lobe can be electronically shifted while the physical antenna remains stationary. The operator of the unit can thereby examine different regions of interest (e.g., different sides of the production tubing). Increasing the number of individual antenna elements in the array will increase the directivity (signal gain) of the antenna.

Figure 6:
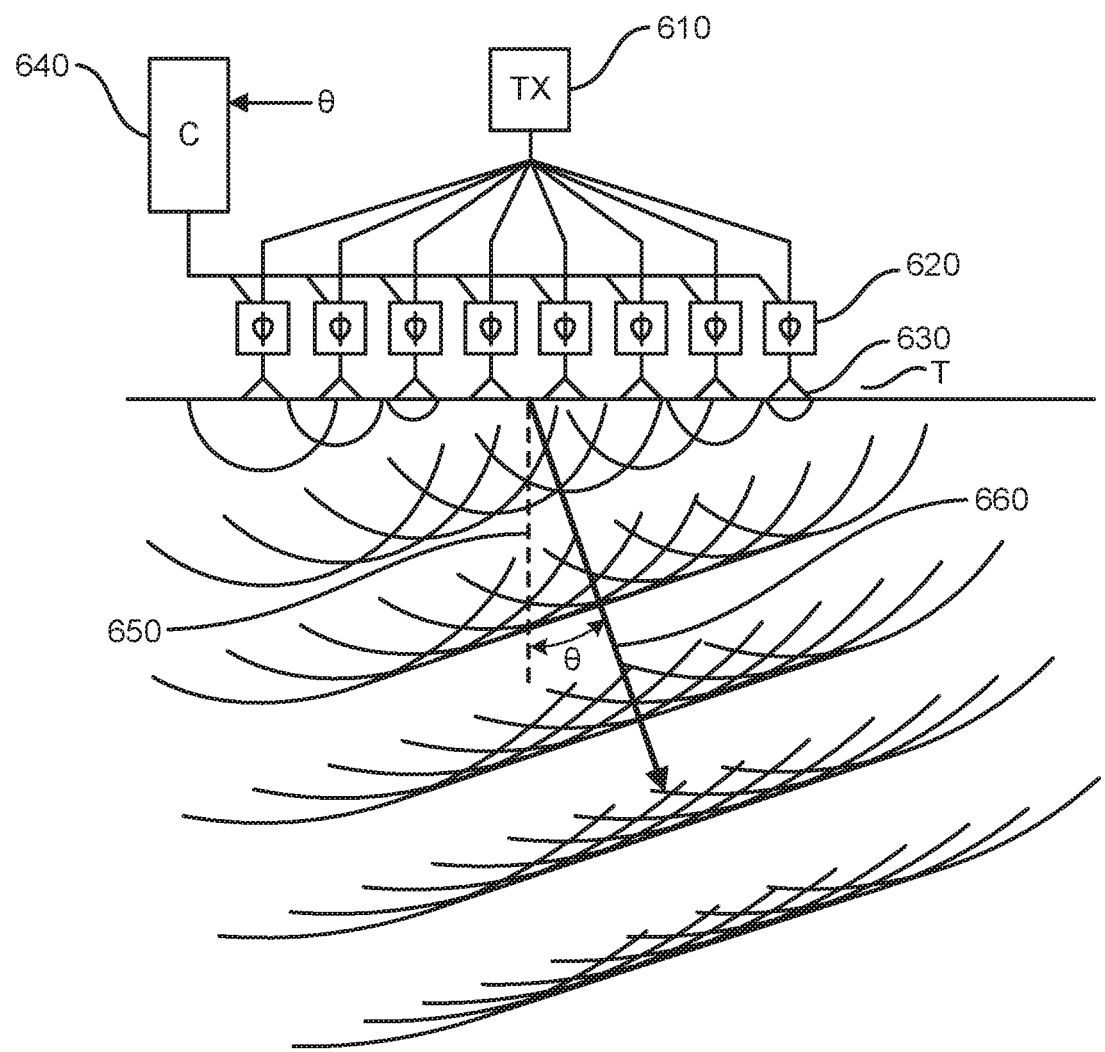
FIG. 6 is a diagram illustrating a linear phased array antenna in accordance with one embodiment.

Referring to FIG. 6, a diagram illustrating the general structure of a linear phased-array antenna in accordance with one embodiment is shown. In this embodiment, a transmitter 610 generates a signal to be transmitted to the antenna. The transmitter may include the electronics, signal generators, amplifiers and other components discussed above (e.g., in connection with FIG. 3). The signal generated by transmitter 610 is provided to each of a set of individual antenna elements. In this embodiment, each antenna element includes a phase shift component (e.g., 620) and an antenna component (e.g., 630). Each of the phase shift components is connected to a phase controller 640. Phase controller 640 receives and input which identifies the angle θ at which the emitted wavefront is to be steered (where θ is the angle between the normal 650 to the antenna and the direction 660 of propagation of the wavefront). Based upon this input and the known geometry of the antenna components 630, phase controller 640 determines a phase angle φ to be provided to the phase shift components 620. Assuming that the antenna components are evenly spaced, the phase shift components will shift the phases of the signal provided by transmitter 610 so that each antenna component receives a copy of the signal that is shifted from copies provided to adjacent antenna components by φ, thereby causing the wavefronts to propagate in direction 660.

When the antenna is used to receive reflected radar waves, the same antenna structure is used. When receiving the reflected waves, the phase shift components will shift the signals received at each antenna component by an amount determined by the corresponding phase shift component, so that the antenna functions as a directional receiver. Thus, phase shift φ which causes the radiated wavefront to propagate in direction 660 will also cause the antenna to focus on signals from this same direction. The signal from each intended component, as shifted by the corresponding phase shift component, may be amplified and provided to a receiver rather than transmitter 610. The receiver will then process the signals from the respective antenna elements as described above.

Portions of the methods described herein may be implemented in suitable software code that may reside within memory and may be executable by appropriate logic circuits. Those skilled in the relevant art will appreciate that the invention can be implemented or practiced with hardware configurations other than those described in connection with the specific embodiments shown above. Portions of the disclosed embodiments can be implemented in application specific integrated circuits, programmable logic devices, field programmable gate arrays, optical, chemical, biological, quantum or nanoengineered systems, components and mechanisms, processors or other hardware that is configured or constructed to perform the functions described in detail herein. A "processor" includes any, hardware system, mechanism or component that processes data, signals or other information. A processor can include a system with a central processing unit, multiple processing units, dedicated circuitry for achieving functionality, or other systems.

It is also within the spirit and scope of the invention to implement in software programming or code any of the steps, operations, methods, routines or portions thereof described herein, where such software programming or code can be stored in a computer-readable medium and can be operated on by a processor, logic circuit or the like to permit them to perform any of the steps, operations, methods, routines or portions thereof described herein.

Functions of the disclosed embodiments may be shared/distributed among one or more components that are communicatively coupled to each other. Communications between components implementing these embodiments can be accomplished using any electronic, optical, radio frequency signals, or other suitable methods and tools of communication in compliance with known protocols.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system comprising:
   a surface power and communications system positioned at the surface of a well;
   a downhole radar system communicatively coupled to the surface power and communications system by one or more power and communication lines;
   wherein the downhole radar system includes
      an electronics subsystem including main controller electronics, an RF signal generator, and RF power amplification and impedance matching electronics, and
      an antenna subsystem communicatively coupled to the electronics subsystem,
   wherein the electronics subsystem is configured to receive power from the surface power and communications system, wherein the main controller electronics is configured to generate a baseband signal which is provided to an RF signal generator, wherein the RF signal generator is configured to generate an RF signal which is provided to RF power amplification and impedance matching electronics, and wherein the RF power amplification and impedance matching electronics are configured to generate amplified and impedance-matched RF signals and provide the amplified and impedance-matched RF signals to an antenna subsystem;
   wherein the antenna subsystem is configured to
      receive the amplified and impedance-matched RF signals,
      generate wireless radar wavefronts from the amplified and impedance-matched RF signals, wherein the generated radar wavefronts are directed toward one or more downhole locations of interest,
      receive reflected wireless radar wavefronts from the one or more downhole locations of interest, and
      communicate electrical signals corresponding to the received reflected wireless radar wavefronts to the electronics subsystem.

2. The system of claim 1, wherein the wherein the antenna subsystem comprises a directional antenna.

3. The system of claim 2, wherein the directional antenna comprises at least one of: a phased array antenna; a Yagi antenna; a log periodic antenna; and a bowtie antenna.

4. The system of claim 2, wherein the directional antenna is mechanically steered.

5. The system of claim 1, wherein the main controller electronics are configured to communicate with the surface power and communications system, and wherein the main controller electronics are configured to analyze the received second electrical signals and to communicate analysis results to the surface power and communications system.

6. The system of claim 1, wherein the electronics subsystem and the antenna subsystem are contained in an annular housing that surrounds production tubing installed in the well.

7. The system of claim 1, wherein the downhole radar system is coupled to the surface power and communications system by a comms-on system that enables communication of data and transmission of power over one or more common electrical lines.

8. A method comprising:
positioning a radar system downhole in a well, wherein the downhole radar system is communicatively coupled to a power and communications system positioned at the surface of the well;
providing power from the surface power and communications system to an electronics subsystem of the downhole radar system including main controller electronics;
generating, by the main controller electronics, a baseband signal which is provided to an RF signal generator;
generating, by the RF signal generator, an RF signal which is provided to RF power amplification and impedance matching electronics;
generating, by the RF power amplification and impedance matching electronics, amplified and impedance-matched RF signals and providing the amplified and impedance-matched RF signals to an antenna subsystem;
generating, by the antenna subsystem, wireless radar wavefronts from the received amplified and impedance-matched RF signals;
receiving, by the antenna subsystem, one or more reflected wireless radar wavefronts;
providing to the electronics subsystem electronic signals corresponding to the received reflected wireless radar wavefronts;
the electronics subsystem processing the electronic signals corresponding to the received reflected wireless radar wavefronts and thereby generating corresponding data that is communicated by the electronics subsystem to the surface power and communications system; and
the surface power and communications system identifying one or more downhole features based on the data corresponding to the received reflected wireless radar wavefronts which is received from the electronics subsystem.

9. The method of claim 8, wherein the wherein the antenna subsystem comprises a directional antenna.

10. The method of claim 9, wherein the directional antenna comprises at least one of: a phased array antenna; a Yagi antenna; a log periodic antenna; and a bowtie antenna.

11. The method of claim 8, wherein the electronics subsystem communicates the data to the surface power and communications system via a comms-on system that enables communication of data and transmission of power over one or more common electrical lines.

12. The method of claim 8, wherein the identified downhole features comprise one or more of: a fluid level in the well; a level of solids in the well; a formation shift; a pipe leak in the well; and pipe movement in the well.

13. The method of claim 8, further comprising steering the wireless radar wavefronts in a desired direction.

14. The method of claim 13, wherein steering the wireless radar wavefronts comprises providing to the antenna subsystem phase shifted copies of an RF signal to a phased array antenna and controlling the phase shift to thereby steer the generated wireless radar wavefronts.

15. The method of claim 13, wherein steering the wireless radar wavefronts comprises mechanically changing a position of at least one component of the antenna subsystem.

* * * * *